(12) United States Patent
Blankenship et al.

(10) Patent No.: US 9,473,279 B2
(45) Date of Patent: Oct. 18, 2016

(54) INTER-CELL INTERFERENCE COORDINATION FOR E-PDCCH

(75) Inventors: Yufei Wu Blankenship, Kildeer, IL (US); Shiwei Gao, Nepean (CA); Hua Xu, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 906 days.

(21) Appl. No.: 13/289,812

(22) Filed: Nov. 4, 2011

(65) Prior Publication Data

US 2013/0114517 A1 May 9, 2013

(51) Int. Cl.
*H04W 4/00* (2009.01)
*H04L 5/00* (2006.01)
*H04W 92/20* (2009.01)

(52) U.S. Cl.
CPC ........... *H04L 5/0053* (2013.01); *H04L 5/0073* (2013.01); *H04L 5/0094* (2013.01); *H04L 5/0023* (2013.01); *H04W 92/20* (2013.01)

(58) Field of Classification Search
None
See application file for complete search history.

(56) References Cited

U.S. PATENT DOCUMENTS

| | | |
|---|---|---|
| 2008/0186862 A1 | 8/2008 | Corbett et al. |
| 2008/0247375 A1 | 10/2008 | Muharemovic et al. |
| 2010/0220626 A1 | 9/2010 | Das et al. |
| 2011/0002285 A1* | 1/2011 | Kim et al. .................... 370/329 |
| 2011/0170496 A1 | 7/2011 | Fong et al. |
| 2012/0014333 A1* | 1/2012 | Ji .......................... H04L 5/0032 370/329 |

FOREIGN PATENT DOCUMENTS

| | | |
|---|---|---|
| CA | 2792762 A1 | 10/2011 |
| WO | 2011119750 A1 | 9/2011 |
| WO | WO 2013036005 A1 * | 3/2013 ........ H04W 72/0426 |

OTHER PUBLICATIONS

3GPP TS 36.423 V10.2.0; 3rd Generation Partnership Project; Technical Specification Group Radio Access Network; Evolved Universal Terrestrial Radio Access Network (E-UTRAN); X2 Application Protocol (X2AP); Release 10; Jun. 2011; 130 pages.
3GPP TS 36.211 V10.1.0; 3rd Generation Partnership Project; Technical Specification Group Radio Access Network; Evolved Universal Terrestrial Radio Access (E-UTRA); Physical Channels and Modulation; Release 10; Mar. 2011; 103 pages.
3GPP TS 36.212 V10.1.0; 3rd Generation Partnership Project; Technical Specification Group Radio Access Network; Evolved Universal Terrestrial Radio Access (E-UTRA); Mutiplexing and Channel Coding; Release 10; Mar. 2011; 76 pages.
3GPP TS 36.213 V10.1.0; 3rd Generation Partnership Project; Technical Specification Group Radio Access Network; Evolved Universal Terrestrial Radio Access (E-UTRA); Physical Layer Procedures; Release 10; Mar. 2011; 115 pages.

(Continued)

*Primary Examiner* — Kouroush Mohebbi
(74) *Attorney, Agent, or Firm* — Conley Rose, P.C.; J. Robert Brown, Jr.

(57) ABSTRACT

A method is provided for communication in a wireless telecommunication system. The method comprises transmitting, by a first access node, an indicator to a second access node over an interface between the first access node and the second access node, wherein the indicator provides information on a transmission of a control channel by the first access node.

25 Claims, 13 Drawing Sheets

(56) References Cited

OTHER PUBLICATIONS

3GPP TS 36.331 V10.1.0; 3rd Generation Partnership Project; Technical Specification Group Radio Access Network; Evolved Universal Terrestrial Radio Access (E-UTRA); Radio Resource Control (RRC); Protocol Specification; Release 10; Mar. 2011; 290 pages.
PCT International Search Report; Application No. PCT/US2012/062591; Jan. 22, 2013; 2 pages.
PCT Written Opinion of the International Searching Authority; Application No. PCT/US2012/062591; Jan. 22, 2013; 5 pages.
Korean Office Action as Received in Co-pending Application No. 10-2014-7015184 on Aug. 11, 2015; 4 pages. (No English translation available).
3GPP TS 36.213 V10.3.0; 3rd Generation Partnership Project; Technical Specification Group Radio Access Network; Evolved Universal Terrestrial Radio Access (E-UTRA); Physical Layer Procedures; Release 10; Sep. 2011; 122 pages.
3GPP TS 36.423 V10.3.0; 3rd Generation Partnership Project; Technical Specification Group Radio Access Network; Evolved Universal Terrestrial Radio Access Network (E-UTRAN); X2 Application Protocol (X2AP); Release 10; Sep. 2011; 132 pages.
3GPP TSG-RAN WG1 Meeting #66bis; "Discussion on Enhanced Downlink Control Channel Design"; R1-113223; Zhuhai, China; Oct. 10-14, 2011; 3 pages.
3GPP TSG RAN WG1 Meeting #66bis; "Considerations on Enhanced PDCCH"; R1-113130; Zhuhai, China; Oct. 10-14, 2011; 3 pages.
European Extended Search Report; Application No. 12844712.5; May 26, 2015; 10 pages.
Korean Office Action as Received in Co-pending Application No. 10-2014-7015184 on Feb. 5, 2016; 4 pages. (No English translation available).
European Examination Report; Application No. 12844712.5; May 9, 2016; 5 pages.

\* cited by examiner

| IE/Group Name | Presence | Range | IE type and reference | Semantics description | Criticality | Assigned Criticality |
|---|---|---|---|---|---|---|
| RNTP Per PRB | M | | BIT STRING (6..110, ...) | Each position in the bitmap represents a $n_{PRB}$ value (i.e. first bit=PRB 0 and so on), for which the bit value represents $RNTP\ (n_{PRB})$, defined in TS 36.213. Value 0 indicates "Tx not exceeding RNTP threshold". Value 1 indicates "no promise on the Tx power is given" | – | – |
| RNTP Threshold | M | | ENUMERATED (-∞, -11, -10, -9, -8, -7, -6, -5, -4, -3, -2, -1, 0, 1, 2, 3, ...) | $RNTP_{threshold}$ is defined in TS 36.213 | – | – |
| Number Of Cell-specific Antenna Ports | M | | ENUMERATED (1, 2, 4, ...) | $P$ (number of antenna ports for cell-specific reference signals) defined in TS 36.211 | – | – |
| P_B | M | | INTEGER (0..3, ...) | $P_B$ is defined in TS 36.213 | – | – |
| PDCCH Interference Impact | M | | INTEGER (0..4, ...) | Measured by Predicted Number Of Occupied PDCCH OFDM Symbols (see TS 36.211). Value 0 means "no prediction is available" | – | – |

Figure 4 (prior art)

| IE/Group Name | Presence | Range | IE type and reference | Semantics description |
|---|---|---|---|---|
| DL HII | M | | BIT STRING (1..110, ...) | Each position in the bitmap represents a PRB (first bit=PRB 0 and so on), for which value '"1" indicates 'high interference sensitivity' and value "0" indicates 'low interference sensitivity'. The maximum number of Physical Resource Blocks is 110 |

Figure 8

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 to maxCellineNB | | | EACH | ignore |
| >>Cell ID | M | | ECGI 9.2.14 | Id of the source cell | – | – |
| >>UL Interference Overload Indication | O | | 9.2.17 | | – | – |
| >>UL High Interference Information | | 0 to maxCellineNB | | | – | – |
| >>>Target Cell ID | M | | ECGI 9.2.14 | Id of the cell for which the UL HII is meant | – | – |
| >>>UL High Interference Indication | M | | 9.2.18 | | – | – |
| >>Relative Narrowband Tx Power (RNTP) | O | | 9.2.19 | | – | – |
| >>DL High Interference Information | | 0 to maxCellineNB | | | = | = |
| >>>Target Cell ID | M | | ECGI xxx | Id of the cell for which the DL HII is meant | = | = |
| >>>DL High Interference Indication | M | | xxxx | | = | = |
| >>ABS Information | O | | 9.2.54 | | YES | ignore |
| >>Invoke Indication | O | | 9.2.55 | | YES | ignore |

Figure 9

| IE/Group Name | Presence | Range | IE type and reference | Semantics description | Criticality | Assigned Criticality |
|---|---|---|---|---|---|---|
| RNTP Per PRB | M | | BIT STRING (6..110, ...) | Each position in the bitmap represents a $n_{PRB}$ value (i.e. first bit=PRB 0 and so on), for which the bit value represents $RNTP(n_{PRB})$, defined in TS 36.213 [. Value 0 indicates "Tx not exceeding RNTP threshold". Value 1 indicates "no promise on the Tx power is given" | – | – |
| RNTP Threshold | M | | ENUMERATED (-∞, -11, -10, -9, -8, -7, -6, -5, -4, -3, -2, -1, 0, 1, 2, 3, ...) | $RNTP_{threshold}$ is defined in TS 36.213 | – | – |
| Number Of Cell-specific Antenna Ports | M | | ENUMERATED (1, 2, 4, ...) | P (number of antenna ports for cell-specific reference signals) defined in TS 36.211 | – | – |
| P_B | M | | INTEGER (0..3, ...) | $P_B$ is defined in TS 36.213 | – | – |
| PDCCH Interference Impact | M | | INTEGER (0..4, ...) | Measured by Predicted Number Of Occupied PDCCH OFDM Symbols (see TS 36.211). Value 0 means "no prediction is available" | – | – |
| E-PDCCH Interference Impact | M | | BIT STRING | PRB indication of E-PDCCH region | | |

Figure 10

| System Bandwidth $N_{RB}^{DL}$ | RBG Size (P) |
|---|---|
| ≤10 | 1 |
| 11 – 26 | 2 |
| 27 – 63 | 3 |
| 64 – 110 | 4 |

Figure 11 (prior art)

```
epdcch-Config                  SEQUENCE {
    resourceAllocationType         ENUMERATED {type0, type1, type2Localized, type2Distributed,
                                              spare4, spare3, spare2, spare1},
    resourceBlockAssignment        CHOICE {
        type01                         CHOICE {
            nrb6                           BIT STRING (SIZE(6)),
            nrb15                          BIT STRING (SIZE(8)),
            nrb25                          BIT STRING (SIZE(13)),
            nrb50                          BIT STRING (SIZE(17)),
            nrb75                          BIT STRING (SIZE(19)),
            nrb100                         BIT STRING (SIZE(25))
        },
        type2                          CHOICE {
            nrb6                           BIT STRING (SIZE(5)),
            nrb15                          BIT STRING (SIZE(7)),
            nrb25                          BIT STRING (SIZE(9)),
            nrb50                          BIT STRING (SIZE(11)),
            nrb75                          BIT STRING (SIZE(12)),
            nrb100                         BIT STRING (SIZE(13))
        },
        ...
    }
}
```

| *E-PDCCH Region Config* field descriptions |
|---|
| *resourceAllocationType* |
| Represents the resource allocation used: type 0, type 1 or type 2 according to TS 36.213. Value type0 corresponds to type 0, value type1 corresponds to type 1, value type2 Localized corresponds to type 2 with localized virtual resource blocks and type2 Distributed corresponds to type 2 with distributed virtual resource blocks. |
| *resourceBlockAssignment* |
| Indicates the resource block assignment bits according to TS 36.213. Value type01 corresponds to type 0 and type 1, and the value type2 corresponds to type 2. Value nrb6 corresponds to a downlink system bandwidth of 6 resource blocks, value nrb15 corresponds to a downlink system bandwidth of 15 resource blocks, and so on. |

Figure 12

| IE/Group Name | Presence | Range | IE type and reference | Semantics description | Criticality | Assigned Criticality |
|---|---|---|---|---|---|---|
| RNTP-EPDCCH Per PRB | M | | BIT STRING (6..110, ...) | Each position in the bitmap represents a $n_{PRB}$ value (i.e. first bit=PRB 0 and so on), for which the bit value represents *RNTP-EPDCCH ($n_{PRB}$)*. Value 0 indicates "Tx not exceeding RNTP-EPDCCH threshold", Value 1 indicates "no promise on the Tx power is given" | – | – |
| RNTP-EPDCCH Threshold | M | | ENUMERATED (-∞,-8, -7, -6, -5, -4, -3, -2, -1, 0, 1, 2, 3, 4, 5, 6 ...) | RNTP-EPDCCH threshold takes one of the enumerated value. The unit is in dB. | – | – |

Figure 13

INTER-CELL INTERFERENCE COORDINATION FOR E-PDCCH

FIELD OF THE DISCLOSURE

The present disclosure relates to a physical downlink control channel in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node.

LTE may be said to correspond to Third Generation Partnership Project (3GPP) Release 8 (Rel-8 or R8), Release 9 (Rel-9 or R9), and Release 10 (Rel-10 or R10), and possibly also to releases beyond Release 10, while LTE Advanced (LTE-A) may be said to correspond to Release 10 and possibly also to releases beyond Release 10. As used herein, the terms "legacy", "legacy UE", and the like might refer to signals, UEs, and/or other entities that comply with LTE Release 10 and/or earlier releases but do not comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a table of a relative narrow-band transmission power information element, according to the prior art.

FIG. 8 is a table of a downlink high interference indication, according to an implementation of the disclosure.

FIG. 9 is a table of a load information message with a downlink high interference indication added, according to an implementation of the disclosure.

FIG. 10 is a table of a relative narrow-band transmission power information element with a new field added for an E-PDCCH, according to an implementation of the disclosure.

FIG. 11 is a table of resource allocation resource block group size vs. downlink system bandwidth, according to the prior art.

FIG. 12 is an example of resource allocation definition for an E-PDCCH region, according to an implementation of the disclosure.

FIG. 13 is a table of RNTP-EPDCCH fields that can be added to the RNTP information element, according to an implementation of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

In an LTE system, physical downlink control channels (PDCCHs) are used to carry downlink (DL) or uplink (UL) data scheduling information, or grants, from an eNB to one or more UEs. The scheduling information may include a resource allocation, a modulation and coding rate (or derived from transport block size), the identity of the intended UE or UEs, and other information. A PDCCH could be intended for a single UE, multiple UEs or all UEs in a cell, depending on the nature and content of the scheduled data. A broadcast PDCCH is used to carry scheduling information for a physical downlink shared channel (PDSCH) that is intended to be received by all UEs in a cell, such as a PDSCH carrying system information about the eNB. A multicast PDCCH is intended to be received by a group of UEs in a cell. A unicast PDCCH is used to carry scheduling information for a PDSCH that is intended to be received by only a single UE.

Figure 1:
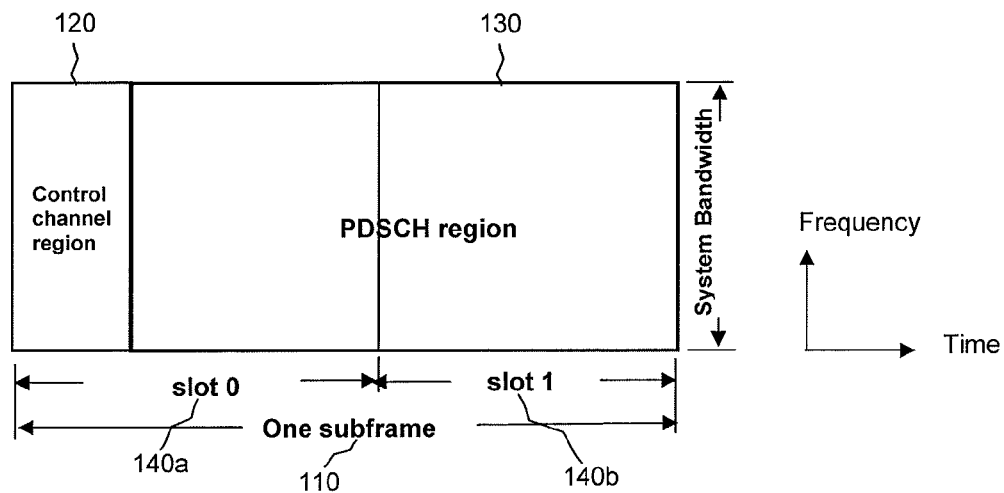
FIG. 1 is a diagram of a downlink LTE subframe, according to the prior art.

FIG. 1 illustrates a typical DL LTE subframe 110. Control information such as the PCFICH (physical control format indicator channel), PHICH (physical HARQ (hybrid automatic repeat request) indicator channel), and PDCCH are transmitted in a control channel region 120. The control channel region 120 includes the first few OFDM (orthogonal frequency division multiplexing) symbols in the subframe 110. The exact number of OFDM symbols for the control channel region 120 is either dynamically indicated by PCFICH, which is transmitted in the first symbol, or semi-statically configured in the case of carrier aggregation in LTE Rel-10.

The PDSCH, PBCH (physical broadcast channel), PSS/SSS (primary synchronization signal/secondary synchronization signal), and CSI-RS (channel state information reference signal) are transmitted in a PDSCH region 130. DL user data is carried by the PDSCH channels scheduled in the PDSCH region 130. Cell-specific reference signals are transmitted over both the control channel region 120 and the PDSCH region 130, as described in more detail below.

Each subframe 110 can include a number of OFDM symbols in the time domain and a number of subcarriers in the frequency domain. An OFDM symbol in time and a subcarrier in frequency together define a resource element (RE). A physical resource block (RB) can be defined as, for example, in LTE, 12 consecutive subcarriers in the frequency domain and all the OFDM symbols in a slot in the time domain. An RB pair with the same RB index in slot 0 (140a) and slot 1 (140b) in a subframe can be allocated together.

Resource blocks can be used to describe the mapping of certain physical channels to resource elements. Physical and virtual resource blocks can be defined. A virtual resource block (VRB) can be of the same size as a physical resource block (PRB). Two types of virtual resource blocks can be defined: virtual resource blocks of localized type and virtual resource blocks of distributed type. Virtual resource blocks of localized type are mapped directly to physical resource blocks such that virtual resource block $n_{VRB}$ corresponds to physical resource block $n_{PRB}=n_{VRB}$. Virtual resource blocks of distributed type are mapped to physical resource blocks via a mapping rule such that adjacent virtual resource blocks are most likely mapped to non-adjacent physical resource blocks.

Figure 2:
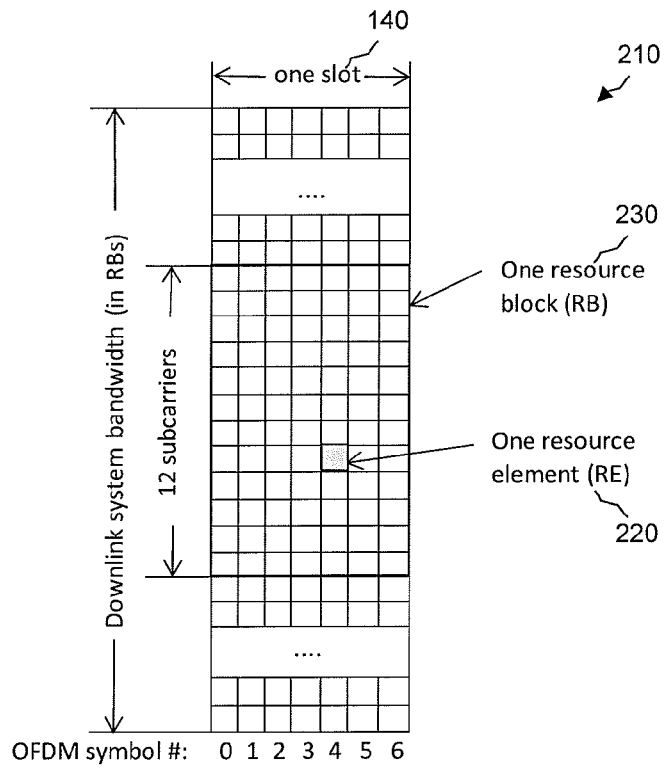
FIG. 2 is a diagram of an LTE downlink resource grid in the case of a normal cyclic prefix, according to the prior art.

FIG. 2 shows an LTE DL resource grid 210 within each slot 140 in the case of a normal cyclic prefix (CP) configuration. The resource grid 210 is defined for each antenna port, i.e., each antenna port has its own separate resource grid 210. Each element in the resource grid 210 for an antenna port is an RE 220, which is uniquely identified by an index pair of a subcarrier and an OFDM symbol in a slot 140. An RB 230 includes a number of consecutive subcarriers in the frequency domain and a number of consecutive OFDM symbols in the time domain, as shown in the figure. An RB 230 is the minimum unit used for the mapping of certain physical channels to REs 220.

Resource element groups (REGs) are used in LTE for defining the mapping of control channels such as the PDCCH to REs. A REG includes either four or six consecutive REs in an OFDM symbol, depending on the number of Cell-specific Reference Signals (CRSs) configured.

Figure 3:
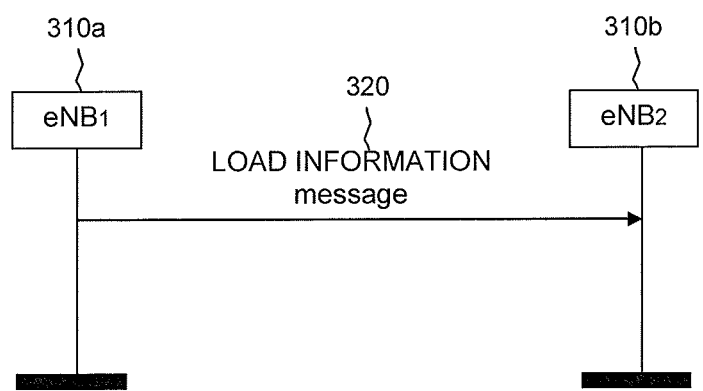
FIG. 3 is a diagram of a load indication procedure over the X2 interface, according to the prior art.

In LTE, specifically 3GPP TS 36.423, the Load Indication procedure over the X2 interface between two eNBs transfers load and interference coordination information between the eNBs, as shown in FIG. 3. A first eNB 310a initiates the procedure by sending a Load Information message 320 to a second eNB 310b to assist in controlling intra-frequency neighboring cells.

For the uplink, two information elements (IEs) can be used for interference indication, the UL Interference Overload Indication and the UL High Interference Indication. The UL Interference Overload Indication (OI) IE, if present in the Load Information message, indicates the interference level experienced by the indicated cell on all PRBs, per PRB. The receiving eNB may take such information into account when setting its scheduling policy. The UL High Interference Indication (HII) IE, if present in the Load Information message, indicates, per PRB, the occurrence of high interference sensitivity, as seen from the sending eNB. The receiving eNB should typically try to avoid scheduling cell edge UEs in its cells for the concerned PRBs.

For the downlink, the Relative Narrowband Tx Power (RNTP) IE can be used for load indication. The RNTP IE, if present in the Load Information message, indicates, per PRB, whether the downlink transmission power is lower than the value indicated by the RNTP Threshold IE. The receiving eNB may take such information into account when setting its scheduling policy. Details of the RNTP IE are shown in the table in FIG. 4.

Figure 5:
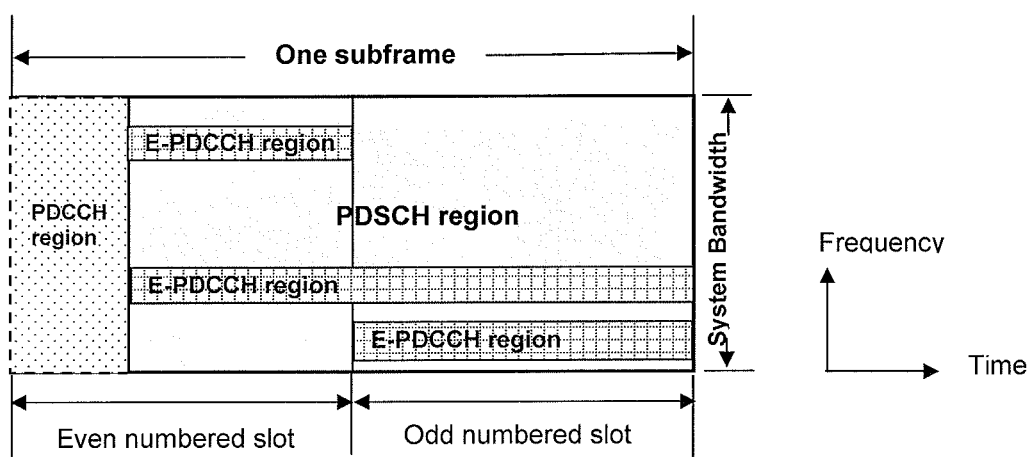
FIG. 5 is a diagram of an example of E-PDCCH regions, according to an implementation of the disclosure.

With the introduction of Multi-User Multiple Input and Multiple Output (MU-MIMO) and future support of Machine to Machine (M2M) communications, the current PDCCH capacity may not be enough to support a large number of UEs in a cell. One approach for PDCCH capacity enhancement is to transmit downlink control information (DCI) in the legacy PDSCH region. That is, some RBs in the traditional PDSCH region can be reserved for DCI transmission to UEs. Hereinafter, a physical downlink control channel transmitted in the legacy PDSCH region will be referred to as an enhanced PDCCH (E-PDCCH). A set of RBs and OFDM symbols reserved for this purpose can be referred to as an E-PDCCH region. The E-PDCCH region in a subframe is not necessarily completely filled with E-PDCCHs in that any resources in the E-PDCCH region not used for E-PDCCH transmission can be assigned for PDSCH transmission. In addition, the legacy PDCCH region may or may not be present in a subframe containing an E-PDCCH region. The time and frequency resources of an E-PDCCH region may be configurable. An example of an E-PDCCH region is shown in FIG. 5.

An E-PDCCH can be assigned to UEs in either a non-interleaved format or an interleaved format. For a non-interleaved E-PDCCH residing in a set of time-frequency resources, there is no other E-PDCCH for another UE in the same set of time-frequency resources. For example, an E-PDCCH can be transmitted on one or several PRBs without cross-interleaving with other E-PDCCHs in a given PRB. In the interleaved format, multiple E-PDCCHs for multiple UEs are interleaved and assigned on the same set of time-frequency resources. For example, multiple E-PDCCHs can be cross-interleaved before being transmitted on one or several PRBs.

The introduction of the E-PDCCH can cause inter-cell interference between eNBs, since the E-PDCCH in a first cell and the PDSCH in a second cell might be transmitted in the same set of time-frequency resources. Thus, there may be a need to perform inter-cell interference coordination for the E-PDCCH. More specifically, interference scenarios that may occur include interference from the E-PDCCH in one cell to the PDSCH in adjacent cells, interference from the PDSCH in one cell to the E-PDCCH in adjacent cells, and interference from the E-PDCCH in one cell to the E-PDCCH in adjacent cells.

In the case of interference from the E-PDCCH in one cell to the PDSCH in adjacent cells, the nature of the interference to the PDSCH can be expected to be similar to the case of interference from the PDSCH in one cell to the PDSCH in adjacent cells. Thus, the existing RNTP may be used to inform the adjacent cells about the relative transmission power of the E-PDCCH without the E-PDCCH being distinguished from the PDSCH. If the power levels of the E-PDCCH and the PDSCH need to be distinguished, then a new RNTP dedicated to the E-PDCCH may be necessary, as described below.

In the case of interference from the PDSCH in one cell to the E-PDCCH in adjacent cells, higher interference may cause a problem for E-PDCCH reception, so the adjacent cells may need to avoid allocating an E-PDCCH in the RBs where higher interference may be experienced. Alternatively, if an E-PDCCH has been allocated on time-frequency resources in a cell, adjacent cells may need to avoid transmitting PDSCHs with higher power in the same RBs.

The case of interference from an E-PDCCH in one cell to an E-PDCCH in adjacent cells can be avoided with proper E-PDCCH configuration.

Figure 6:
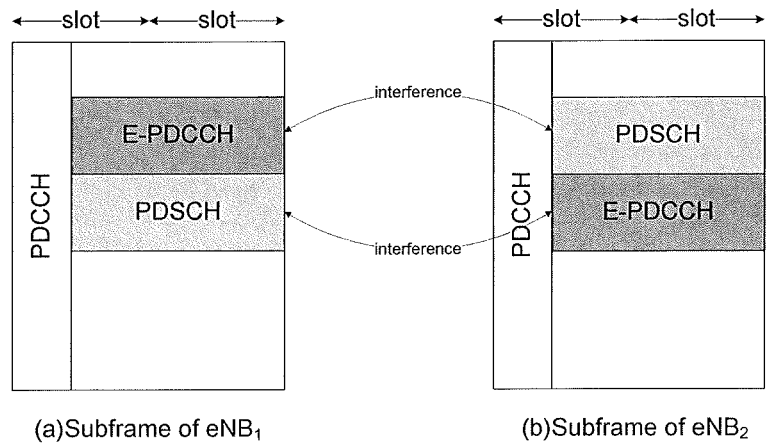
FIG. 6 is a diagram of inter-cell interference for non-interleaved E-PDCCHs, according to an implementation of the disclosure.
Figure 7:
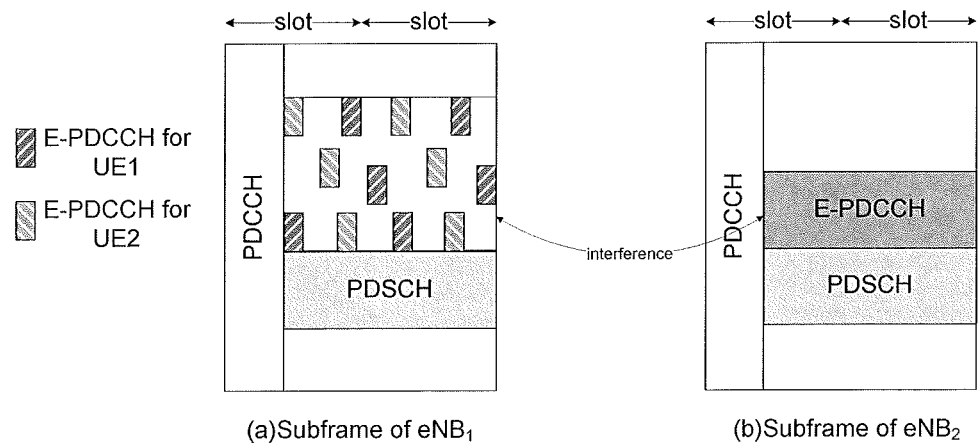
FIG. 7 is a diagram of inter-cell interference for interleaved E-PDCCHs, according to an implementation of the disclosure.

The first and second scenarios described above are illustrated in FIG. 6 with examples of non-interleaved E-PDCCHs. The third scenario described above is illustrated in FIG. 7 with an example of an interleaved E-PDCCH interfering with a non-interleaved E-PDCCH.

Inter-cell interference coordination (ICIC) techniques exist for the PDSCH. However, the situation for the E-PDCCH is different from that of the PDSCH in that the E-PDCCH carries downlink control information, which needs to be received correctly before the related data transmission can be received. Specifically, the E-PDCCH needs to be received with a lower error probability than the PDSCH. For example, the DL scheduling information miss detection probability target and the UL scheduling grant miss detection probability target are both $10^{-2}$. In contrast, the normal PDSCH block error probability target is usually around $10^{-1}$.

The embodiments or implementations disclosed herein provide inter-cell interference coordination for the E-PDCCH. In an implementation, the load information carried on the X2 interface can be enhanced to carry E-PDCCH-related information to promote interference-aware scheduling. Both the E-PDCCH itself and its victim (i.e., a signal in an adjacent cell that is transmitted over the same time-frequency resources as the E-PDCCH) are considered in the enhancement of the load information. The E-PDCCH can be protected from strong interference from adjacent cells in two ways. In the E-PDCCH's own cell, the eNB can assign more power to the E-PDCCH than to the PDSCH. In the adjacent cell, the adjacent eNB can lower the power assigned to the relevant RBs. The potentially high interference from an E-PDCCH is also considered for a victim of the E-PDCCH in the adjacent cell. The problem can be exacerbated if relatively higher power is assigned to the E-PDCCH than to the PDSCH.

In other words, an indicator can be exchanged between two eNBs that allows the eNBs to coordinate their transmissions so that an E-PDCCH transmission from one of the eNBs does not cause interference to the other eNB and is not interfered with by the other eNB. That is, a first eNB can ask a second eNB to reduce transmission power or avoid transmitting in one or more resource blocks that the first eNB is using for E-PDCCH transmission so that the second eNB does not interfere with the E-PDCCH transmission. Alternatively or additionally, the first eNB can inform the second eNB that the first eNB will be transmitting the E-PDCCH at high power on one or more particular resource blocks and that the second eNB should take appropriate measures to avoid interference from the first eNB on those resource blocks.

In the implementations described below, the format of individual E-PDCCHs (interleaved or non-interleaved), which is configured by each eNB, may not be exchanged over the X2 interface. Rather, information on the E-PDCCH region is exchanged between eNBs through the X2 interface to better coordinate interference avoidance. This coordination gives scheduling flexibility to individual E-PDCCHs from subframe to subframe. Since the E-PDCCH region definition is expected to be slow-changing, information on the E-PDCCH region can be properly exchanged over X2 without a frequent need to update the information.

In an implementation, new information regarding the E-PDCCH is transferred between adjacent cells over the X2 interface for better interference coordination. As an example, this new information can be provided in one of two ways: a new Downlink High Interference Indication (DL HII) IE can be placed directly in the Load Information message sent over the X2 interface or a new E-PDCCH Interference Impact Indication can be placed in the existing RNTP IE within the Load Information message. The DL HII will be considered first.

The DL HII is a new IE that can tell adjacent cells that certain RBs have been configured for an E-PDCCH in a source cell and that any high power transmission in those RBs by an adjacent cell could cause interference to the E-PDCCH. The eNB can provide a two-level report on interference sensitivity on the downlink via a binary vector. The table in FIG. 8 shows an example of how a DL HII could be constructed. The table in FIG. 9 shows an example of the Load Information message with new fields added to indicate the DL HII. The newly implemented fields are underlined in these tables and in the tables referred to hereinafter. While the table in FIG. 9 includes a field of "Target Cell ID" for the DL HII group, that field may be omitted if that field is the same for the UL HII group.

To coordinate the allocation of E-PDCCH resources between eNBs, the sending eNB could mark PRBs of the E-PDCCH region with a value of "1" for high downlink interference sensitivity. This indicator received over the X2 interface can be used by the receiving eNB to lower the downlink interference it may cause to those PRBs of the source eNB. For example, the receiving eNB can lower the power it uses for those PRBs by scheduling only cell-center UEs on those PRBs. The receiving eNB could also avoid scheduling cell-edge UEs in its cell for the concerned PRBs.

The Target Cell ID IE received within the DL High Interference Information IE group in the Load Information message indicates the cell for which the corresponding DL HII is meant. The receiving eNB can consider the value of the DL High Interference Information IE group valid until reception of a new Load Information message carrying an update.

As an alternative to the DL HII being added to the Load Information message, an E-PDCCH Interference Impact Indication can be added as a new field to the existing RNTP IE within the Load Information message to indicate the E-PDCCH RBs. The introduction of such a new field to the RNTP is illustrated in the table in FIG. 10.

In various implementations, E-PDCCH resource allocation signaling can be performed in different ways for either the DL HII implementation or the E-PDCH Interference Impact Indication implementation or other mechanisms. In one example, with a full RB-based bitmap approach, each bit corresponds to a PRB within the system bandwidth. In another example, with a resource block group (RBG) based approach, the resource allocation type of the E-PDCCH is signaled together with a corresponding resource mapping. Further, a simplified approach can be used if E-PDCCH allocation is limited to certain predefined PRBs.

Details are now provided regarding these ways of defining the bit string that can be used to represent the PRB indication of the E-PDCCH region in FIG. 10. If the DL HII is dedicated to the E-PDCCH, these definitions can also apply to bit string in FIG. 8, replacing the value and definition of the bit string of FIG. 8 in accordance with the approach used.

A straightforward approach for E-PDCCH RB indication may be a full bit map as follows:

Bit String for E-PDCCH RB indications=
$\{b_0, b_1, b_2, \ldots, b_{N^{RB}-1}\}$ where bit $b_0$ corresponds to PRB 0, bit $b_1$ corresponds to PRB 1, and so on. $N_{RB}$ is the total number of PRBs. A bit value of "1" could indicate that the corresponding PRB is reserved for an E-PDCCH region, and a bit value of "0" could indicate that the corresponding PRB is not reserved for an E-PDCCH region, or vice versa.

Alternatively, an RBG-based bitmap may be used to reduce the bitmap size and thus reduce signaling overhead. In this approach, resource allocation Type 0 or Type 1 is used for allocating resources for an E-PDCCH region. A RBG is a set of consecutive virtual resource blocks (VRBs) of localized type as defined in section 6.2.3.1 of 3GPP TS 36.211. The RBG sizes for various bandwidths are shown in the table in FIG. 11.

For resource allocation Type 0, the bitmap is of size $N_{RBG}$ bits with one bitmap bit per RBG, such that each RBG is addressable. The RBGs can be indexed in order of increasing frequency and non-increasing RBG sizes starting at the lowest frequency. The order of the RBG-to-bitmap bit mapping can be such that RBG 0 to RBG ($N_{RBG}-1$) are mapped from the most significant bit (MSB) to the least significant bit (LSB) of the bitmap. An RBG is allocated for an E-PDCCH region if the corresponding bit value in the bitmap is "1", and the RBG is not allocated for an E-PDCCH region if the corresponding bit value in the bitmap is "0", or vice versa.

For resource allocation Type 1, a subset of RBGs can be selected first, and VRBs in each selected RBG can then be selected. An RBG subset p, where 0≤p<P and P is the RBG size, can consist of every Pth RBG starting from RBG p. In addition, one bit can be used to indicate if a shift of resource allocation within the subset should be used. If the RBG size is P (see FIG. 11), then the bits used for resource allocation can be as follows: in a first field, $\lceil \log_2(P) \rceil$ bits can indicate the selected RBG subset among P RBG subsets, where $\lceil x \rceil$ indicates the smallest integer that is greater than or equal to x; in a second field, one bit can be used for shift indication; and a third field can include a bitmap where each bit of the bitmap addresses a single VRB in the selected RBG subset in such a way that MSB to LSB of the bitmap are mapped to the VRBs in increasing frequency order. The portion of the bitmap used to address VRBs in a selected RBG subset has size $N_{RB}^{TYPE1}$ and is defined as $N_{RB}^{TYPE1} = \lceil N_{RB}^{DL}/P \rceil - \lceil \log_2(P) \rceil - 1$ bits, where $N_{RB}^{DL}$ is the downlink bandwidth in RBs. The addressable PRB numbers of a selected RBG subset start from an offset, $\Delta_{shift}(p)$ to the smallest PRB number within the selected RBG subset, which is mapped to the MSB of the bitmap. The offset is in terms of the number of PRBs and is done within the selected RBG subset. If the value of the bit in the second field for the shift of the resource allocation span is set to 0, the offset for the RBG subset p is given by $\Delta_{shift}(p)=0$. Otherwise, the offset for the RBG subset p is given such that the LSB of the bitmap is justified with the highest PRB number within the selected RBG subset. Compared to resource allocation Type 0 where the resource resolution is P contiguous PRBs, resource allocation Type 1 gives the flexibility to address individual RBs.

Another allocation scheme is based on sets of PRB pairs and reuses resource allocation Type 2. In resource allocations of Type 2, the resource block assignment information indicates to a scheduled UE a set of contiguously allocated localized virtual resource blocks or distributed virtual resource blocks. One bit may be needed to indicate if the localized or distributed type of VRB is used. A resource allocation field can consist of a resource indication value (RIV) corresponding to a starting resource block ($RB_{start}$) and a length in terms of virtually contiguously allocated resource blocks $L_{CRBs}$.

As an example, a full resource allocation for an E-PDCCH region can be defined as shown in FIG. 12.

In an implementation, to simplify the definition of an E-PDCCH region, certain parameters or properties of the E-PDCCH region can be predefined. For example, it can be predefined that only PRBs at the upper and lower bandwidth edges are allocated for E-PDCCHs. In this case, two integer values, $RB_{start}$ and $N_{E-PDCCH}$, can be signaled over X2 to indicate that $N_{E-PDCCH}$ RBs are located $RB_{start}$ RBs away from both ends of the bandwidth and have been reserved for E-PDCCH transmission. In another example, it can be predefined that the E-PDCCH region comprises L subregions that are D PRBs from each other, where each subregion is composed of $N_{E-PDCCH}$ PRBs. Thus only three parameters need to be signaled: $\{L, D, N_{E-PDCCH}\}$.

In another example, an E-PDCCH region can be defined to apply only to certain subframes. For instance, interference coordination for the E-PDCCH region might need to be applied only every N subframes, where the period N is an integer ranging from 1 to 10. More broadly speaking, to allow for both periodic and aperiodic allocation, a subframe bitmap can be defined for each eNB to indicate on which subframes coordination for the E-PDCCH region applies. This definition has the benefit of allowing neighbor eNBs to choose different subframe sets to apply the E-PDCCH region so that they can use a similar configuration in the frequency domain, but are separated in the time domain.

In another example, it can be implicitly defined that the occurrence of an E-PDCCH region is related to an ABS (almost blank subframe) pattern. For example, an E-PDCCH region might only apply to non-ABS subframes. Thus, if no ABS IE is defined over the X2 interface or if ABS is inactive, coordination for an E-PDCCH region applies to all subframes. If an ABS IE is defined, then coordination of the E-PDCCH region applies only to those subframes that are not blanked in the ABS pattern.

Alternatively or additionally, to minimize E-PDCCH collisions, a set of non-colliding E-PDCCH region candidates can be predefined, and different eNBs can be allowed to choose a different candidate from the set.

The inter-cell interference coordination techniques described above can apply to the case where the DL HII is used or to the case where the E-PDCCH Interference Impact Indication is used.

In addition to resource allocation, other types of information can be signaled over the X2 interface to allow better interference coordination. In an implementation, the E-PDCCH transmission power can be signaled through the Load Information message over the X2 interface. More specifically, a power threshold and an indication of whether a PRB exceeds the threshold are signaled to the eNBs in the adjacent cells in the RNTP information element within the Load Information message.

Currently in the RNTP, only two levels of transmit power can be signaled: below the RNTP threshold or not below the RNTP threshold. These two levels may not be sufficient if an E-PDCCH is allocated over the same set of OFDM symbols as a PDSCH and RBs carrying E-PDCCHs are likely given more power than RBs carrying PDSCHs. Thus, in an implementation, a second power threshold, which can be referred to as the RNTP-EPDCCH Threshold, can be introduced specifically for an E-PDCCH. Examples of fields that could be related to such a power threshold are illustrated in the table in FIG. 13.

The determination of a reported Relative Narrowband Transmission Power indication $RNTP_{E-PDCCH}(n_{PRB})$ can be defined as follows:

$$RNTP_{E-PDCCH}(n_{PRB}) = \begin{cases} 0 & \text{if } \frac{E_B(n_{PRB})}{E_{max\_nom}^{(p)}} \leq RNTP_{E-PDCCH,threshold} \\ 1 & \text{if no promise about the upper limit of } \frac{E_B(n_{PRB})}{E_{max\_nom}^{(p)}} \text{ is made} \end{cases}$$

where $E_B(n_{PRB})$ is the maximum intended EPRE of E-PDCCH REs in OFDM symbols not containing a reference signal (RS) in this physical resource block on antenna port p in the considered future time interval; $n_{PRB}$ is the physical resource block number $n_{PRB}=0, \ldots, N_{RB}^{DL}-1$; $RNTP_{E-PDCCH,threshold}$ is a threshold and may take on one of the following values $RNTP_{E-PDCCH,threshold} \in \{-\infty, -8, -, -7, -6, -5, -4, -3, -2, -1, 0, +1, +2, +3, +4, +5, +6\}$ [dB]; and $$E_{max\_nom}^{(p)} = \frac{P_{max}^{(p)} \cdot \frac{1}{\Delta f}}{N_{RB}^{DL} \cdot N_{SC}^{RB}},$$

where $P_{max}^{(p)}$ is the base station maximum output power described in 3GPP TS 36.104, and $N_{SC}^{RB}$ and $\Delta f$ are the number of subcarriers in an RB and the subcarrier spacing, respectively, as defined in 3GPP TS 36.211. The $RNTP_{E-PDCCH,threshold}$ value range above serves as an example. Other value ranges can be used as well.

An alternative implementation in the case where the E-PDCCH Interference Impact Indication is used deals with situations where high order modulation is used for the E-PDCCH. When QPSK modulation is used for E-PDCCH transmission, a UE does not need to know amplitude information for the E-PDCCH with respect to a known reference signal in order to demodulate the E-PDCCH. However, if high order modulation (HOM) is used for the E-PDCCH, the UE does need amplitude information to properly decode the E-PDCCH. To convey such information to the UE, similar to the case with the PDSCH, the power ratio between the E-PDCCH and the corresponding RS used for E-PDCCH demodulation can be defined and signaled to the UE through higher layer signaling such as radio resource control (RRC) signaling.

If a cell-specific RS or some other non-precoded RS such as a transmission point-specific RS is used for E-PDCCH demodulation, the ratio of the E-PDCCH EPRE to the RS EPRE among E-PDCCH REs for each OFDM symbol is denoted by either $\rho_{A\_E-PDCCH}$ or $\rho_{B\_E-PDCCH}$ depending on whether or not the RS is present in the OFDM symbol. (This ratio is not applicable to E-PDCCH REs with zero EPRE.) $\rho_{A\_E-PDCCH}$ or $\rho_{B\_E-PDCCH}$ can be applied to the same OFDM indices as defined for $\rho_A$ and $\rho_B$ given by Table 5.2-2 and Table 5.2-3 of 3GPP TS 36.213. As with $\rho_A$ and $\rho_B$, $\rho_{A\_E-PDCCH}$ and $\rho_{B\_E-PDCCH}$ are UE-specific.

If a cell-specific RS or some other non-precoded RS such as a transmission point-specific RS is used for E-PDCCH demodulation, $\rho_{A\_E-PDCCH}$ is equal to $\delta_{power-offset}+P_{A\_E-PDCCH}+10\log_{10}(2)$ [dB] when the UE receives an E-PDCCH transmission using precoding for transmit diversity with four cell-specific antenna ports, according to Section 6.3.4.3 of 3GPP TS 36.211. Otherwise, $\rho_{A\_E-PDCCH}$ is equal to $\delta_{power-offset}+P_{A\_E-PDCCH}$ [dB], where $\delta_{power-offset}$ is 0 dB for all E-PDCCH transmission schemes except multi-user MIMO transmission for E-PDCCH, and where $P_{A\_E-PDCCH}$ is a UE-specific parameter provided by higher layers.

The cell-specific ratio $\rho_{B\_E-PDCCH}/\rho_{A\_E-PDCCH}$ is given according to a cell-specific parameter $P_{B\_E-PDCCH}$, similarly to how $P_B$ is defined in Table 5.2-1 of 3GPP TS 36.213. This ratio, together with the number of configured eNB cell specific antenna ports, is signaled by higher layers.

In general, $P_{A\_E-PDCCH}$ and $P_{B\_E-PDCCH}$ could be defined separately as $P_A$ and $P_B$ and signaled to the UE. For example, $P_{A\_E-PDCCH}$ could take larger values than $P_A$ to boost the E-PDCCH transmission power. $P_{B\_E-PDCCH}$ could take different ratios for from those of $P_B$ to improve E-PDCCH transmission. However, for simplicity, the $P_{A\_E-PDCCH}$ and $P_{B\_E-PDCCH}$ could take the same values as $P_A$ and $P_B$, respectively. In this case, only $P_A$ and $P_B$ may need to be signaled to the UE, and hence signaling overhead can be saved.

If UE-specific RSs are used for E-PDCCH demodulation, the UE may assume that the ratio of the E-PDCCH EPRE to the UE-specific RS EPRE within each OFDM symbol containing a UE-specific RS is 0 dB for a number of transmission layers less than or equal to two. If the number of transmission layers is greater than two, the UE may assume that the ratio of the E-PDCCH EPRE to the UE-specific RS EPRE within each OFDM symbol containing a UE-specific RS is −3 dB, which is similar to the PDSCH case. However, to boost the power of E-PDCCH transmission, a power boosting offset could be included between the E-PDCCH EPRE and the UE-specific RS EPRE.

To promote E-PDCCH performance and avoid inter-cell interference in an E-PDCCH transmission, power control information for the E-PDCCH can be signaled to a neighboring eNB through the X2 interface. For example, $P_{B\_E-PDCCH}$ could be included in RNTP signaling between eNBs if $P_{B\_E\text{-}PDCCH}$ is different from $P_B$. Similarly to $P_B$, the $P_{B\_E\text{-}PDCCH}$ information indicates power boosting to the cell-specific reference signal (CRS). This information can be used by a neighbor eNB to estimate how much interference can be expected from the serving eNB's CRS. This information may not be necessary if an E-PDCCH RE has the same power level as the PDSCH. This information may be necessary if an E-PDCCH RE does not have the same power level as the PDSCH, for example when more power is given to the E-PDCCH.

Some of the benefits of the implementations described herein can be summarized as follows: Information about an E-PDCCH region can be exchanged between eNBs over X2 to allow better interference coordination for an E-PDCCH than possible if relying on the existing mechanism designed for the PDSCH. Also, the time-frequency resources for an E-PDCCH region can be coordinated between eNBs. This coordination provides higher reliability for an E-PDCCH and reduces the influence of an E-PDCCH on neighbor cells. For example, when the DL HII IE is sent from a source eNB, a receiving eNB can lower the downlink interference it may cause to the E-PDCCH PRBs. For instance, the receiving eNB could lower the power it uses for those PRBs by scheduling cell-center UEs on those PRBs. Alternatively or additionally, the receiving eNB could try to avoid scheduling cell-edge UEs in its cell for the concerned PRBs. In addition, the receiving eNB can avoid allocating E-PDCCHs in those PRBs that are reserved for transmitting the eNB's E-PDCCH region, unless the transmit power can be kept low. Further, information on the transmission power level of the E-PDCCH can be exchanged between eNBs to allow better interference management.

Figure 14:
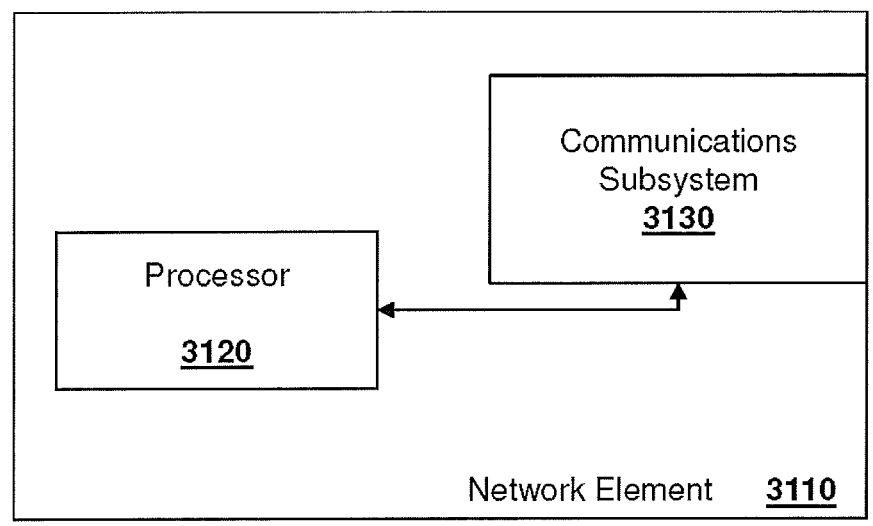
FIG. 14 is a simplified block diagram of an exemplary network element according to one implementation.

The above may be implemented by a network element. A simplified network element is shown with regard to FIG. 14. In FIG. 14, network element 3110 includes a processor 3120 and a communications subsystem 3130, where the processor 3120 and communications subsystem 3130 cooperate to perform the methods described above.

Further, the above may be implemented by a UE. One exemplary device is described below with regard to FIG. 15. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

Figure 15:
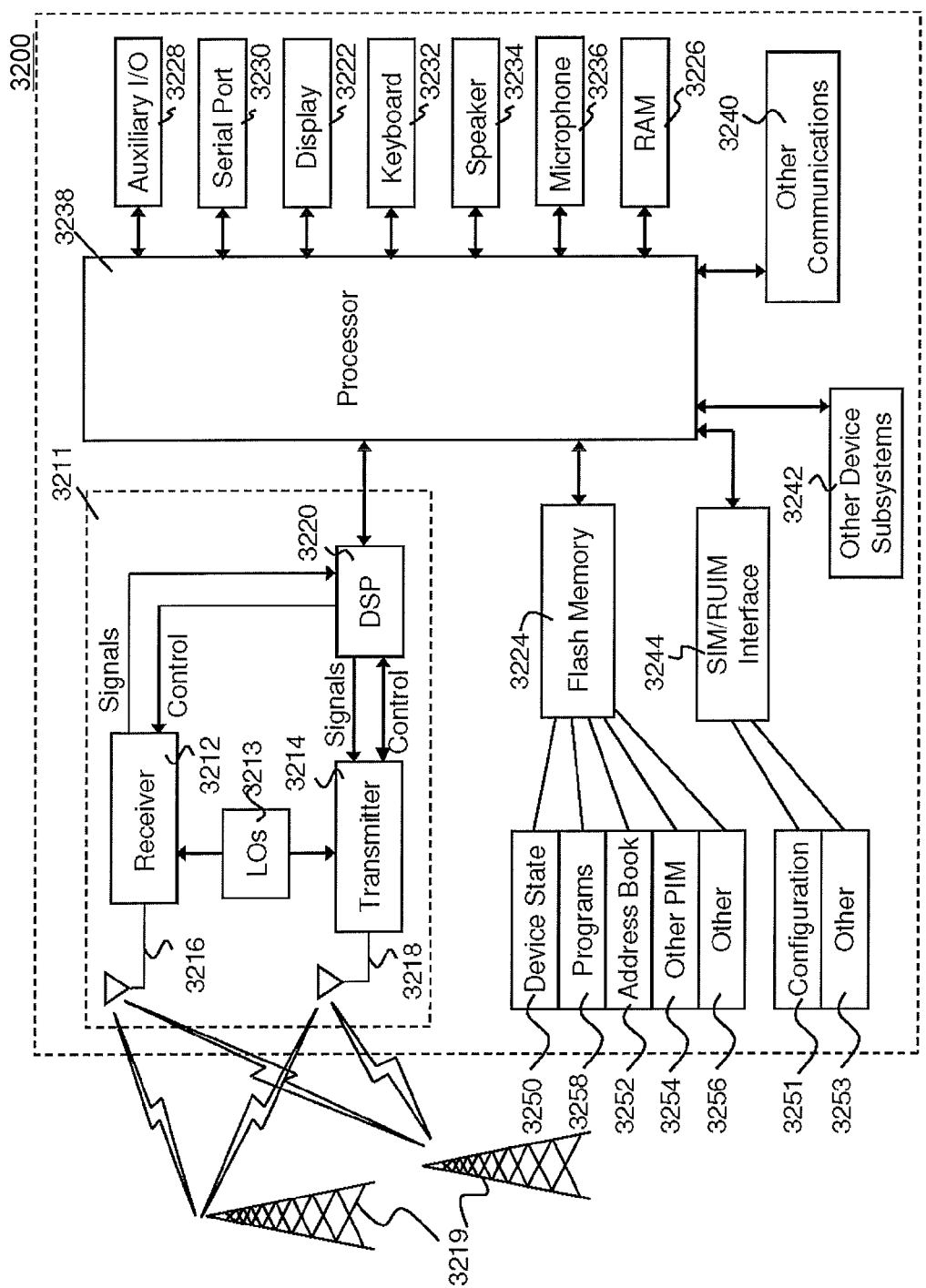
FIG. 15 is a block diagram with an example user equipment capable of being used with the systems and methods in the implementations described herein.

When required network registration or activation procedures have been completed, UE 3200 may send and receive communication signals over the network 3219. As illustrated in FIG. 15, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in FIG. 15 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 15 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 16:
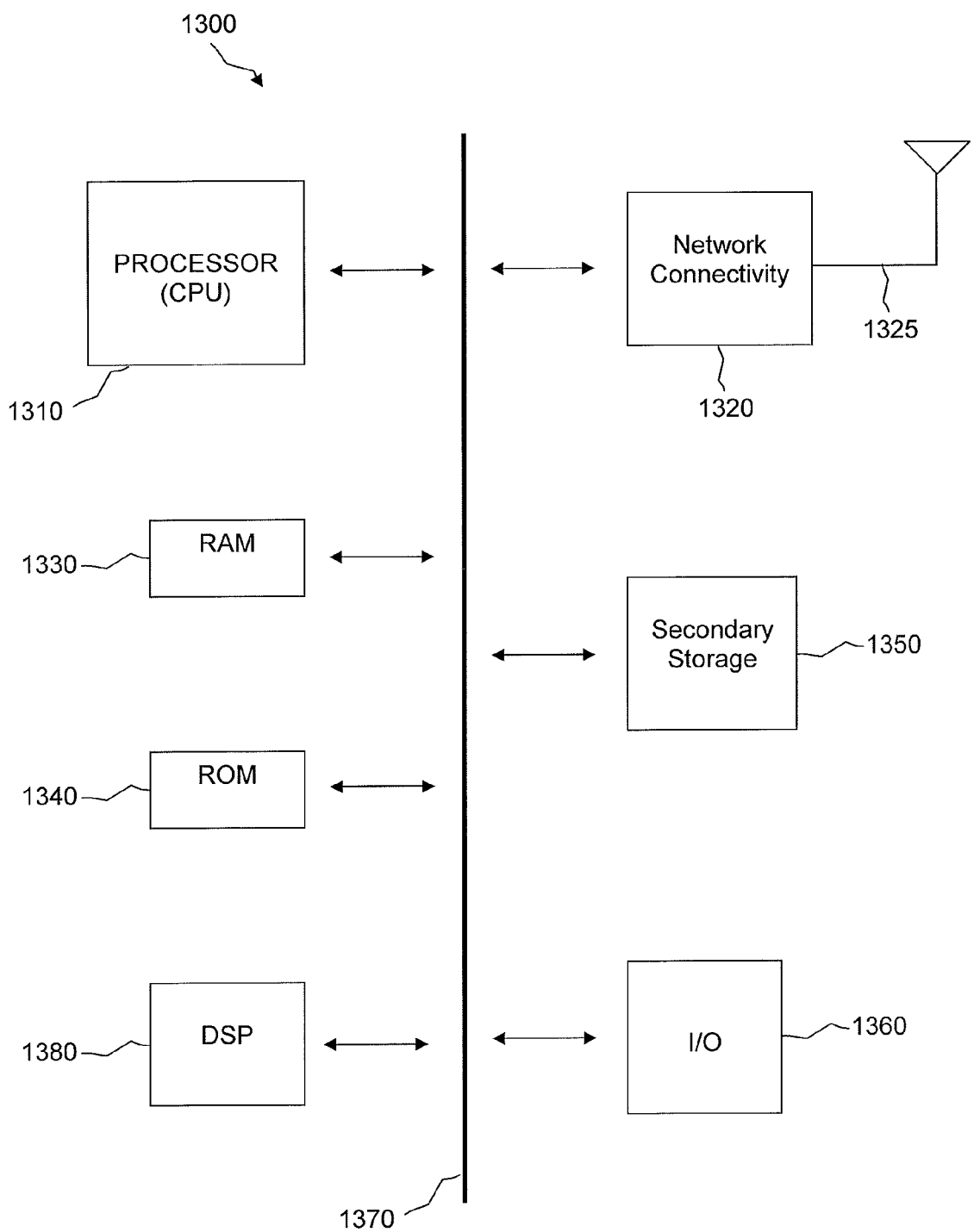
FIG. 16 illustrates a processor and related components suitable for the several implementations of the present disclosure.

The UE and other components described above might include a processing component that is capable of executing instructions related to the actions described above. FIG. 16 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

The following are incorporated herein by reference for all purposes: 3GPP Technical Specification (TS) 36.104, 3GPP TS 36.211, 3GPP TS 36.212, 3GPP TS 36.213, 3GPP TS 36.331, and 3GPP TS 36.423.

In an embodiment, a method is provided for communication in a wireless telecommunication system. The method comprises transmitting, by a first access node, an indicator to a second access node over an interface between the first access node and the second access node, wherein the indicator provides information on a transmission of a control channel by the first access node.

In another embodiment, a first access node in a wireless telecommunication system is provided. The first access node includes a processor configured such that the first access node transmits over an interface between the first access node and a second access node an indicator that provides information on a transmission of a control channel.

In another embodiment, a user equipment is provided. The user equipment includes a receiving component configured to receive a control channel that was transmitted in a resource block that is frequency-division-multiplexed with a data channel, wherein the resource block is located in a region whose configuration is transmitted from an access node serving the user equipment to another access node. This information exchange between the access nodes is normally performed over the X2 interface. The receiving component is further configured to receive power information about the control channel. The user equipment also includes a processing component configured such that the user equipment uses the power information to determine a signal amplitude of the control channel.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunication system, the method comprising:
   processing an indicator;
   transmitting, by a first access node, the indicator to a second access node over an interface between the first access node and the second access node, wherein the indicator provides information on a transmission of a control channel by the first access node; and
   transmitting, by the first access node, the control channel in an enhanced physical downlink control channel (E-PDCCH) region, wherein the control channel is frequency-division-multiplexed with data transmission, wherein the E-PDCCH region is a legacy Physical Downlink Shared Channel (PDSCH) region in which a physical downlink control channel (PDCCH) is transmitted, wherein the indicator includes one power threshold defined for the E-PDCCH.

2. The method of claim 1, wherein the indicator is carried as a component of a Load Information message.

3. The method of claim 2, wherein the indicator is carried as an information element in the Load Information message.

4. The method of claim 2, wherein the indicator is carried as a field in a relative narrowband transmission power (RNTP) information element within the Load Information message.

5. The method of claim 1, wherein the indicator indicates at least one resource block that is to be used by the first access node for transmission of the control channel.

6. The method of claim 5, wherein the indicator further indicates at least one of:
   a location of the at least one resource block; or
   a transmission power of the at least one resource block.

7. The method of claim 5, wherein the indicator includes a value which corresponds to one or more individual resource blocks.

8. The method of claim 5, wherein the indicator includes a value which corresponds to one or more resource block groups, where a resource block group contains one or more resource blocks.

9. The method of claim 5, wherein the indicator includes a value which corresponds to one or more resource block groups and to one or more individual resource blocks within a resource block group.

10. The method of claim 9, wherein the indicator includes a first field to indicate the one or more resource block groups, a second field to indicate whether a shift of the resources blocks is used, and a third field containing a bitmap where each bit in the bitmap is associated with a virtual resource block in the one or more resource block groups.

11. The method of claim 5, wherein the indicator includes a value which corresponds to a set of contiguously allocated virtual resource blocks.

12. The method of claim 11, wherein at least one of the virtual resource blocks is of a localized type.

13. The method of claim 11, wherein at least one of the virtual resource blocks is of a distributed type.

14. The method of claim 5, wherein the at least one resource block is constrained to a predefined subset of all available resource blocks.

15. The method of claim 1, wherein the indicator includes power information about the control channel transmitted by the first access node, wherein the power information indicates a relationship between a power level of the control channel and a power level of a plurality of reference symbols.

16. A first access node in a wireless telecommunication system, the first access node comprising:
   a memory; and
   a processor coupled to the memory comprising processor-executable instructions, wherein the processor is configured such that the first access node transmits over an interface between the first access node and a second access node an indicator that provides information on a transmission of a control channel and transmits the control channel in an enhanced physical downlink control channel (E-PDCCH) region, wherein the control channel is frequency-division-multiplexed with data transmission, wherein the E-PDCCH region is a legacy Physical Downlink Shared Channel (PDSCH) region in which a physical downlink control channel (PDCCH) is transmitted, wherein the indicator includes one power threshold defined for the E-PDCCH.

17. The first access node of claim 16, wherein the indicator includes time domain information indicating when the control channel is transmitted by the first access node.

18. The first access node of claim 16, wherein the indicator includes power information about the control channel transmitted by the first access node.

19. The first access node of claim 18, wherein the power information is carried by a relative narrowband transmission power (RNTP) information element.

20. The first access node of claim 18, wherein the power information indicates a relationship between a power level of the control channel and a power level of a plurality of reference symbols.

21. The first access node of claim 18, wherein the power information includes a power threshold and a value indicating if transmission power of the control channel is below the power threshold.

22. A user equipment comprising:
   a processor; and
   a receiver coupled to the processor and configured to receive a control channel that was transmitted in a resource block that is frequency-division-multiplexed with a data channel, wherein the resource block is located in a region whose configuration is transmitted from an access node serving the user equipment to another access node, wherein the control channel is transmitted in an enhanced physical downlink control channel (E-PDCCH) region, wherein the control channel is frequency-division-multiplexed with data transmission, wherein the E-PDCCH region is a legacy Physical Downlink Shared Channel (PDSCH) region in which a physical downlink control channel (PDCCH) is transmitted, wherein the indicator includes one power threshold that is defined for the E-PDCCH.

23. The user equipment of claim 22, wherein the configuration of the region includes resource allocation information.

24. The user equipment of claim 22, wherein the configuration of the region includes power allocation information.

25. The user equipment of claim 22, wherein power information about the control channel is received in the indicator, wherein the power information indicates a relationship between a power level of the control channel and a power level of a plurality of reference symbols.

* * * * *